July 24, 1923.
E. W. DAVIS
1,462,689
LUBRICATING SYSTEM
Filed March 17, 1920
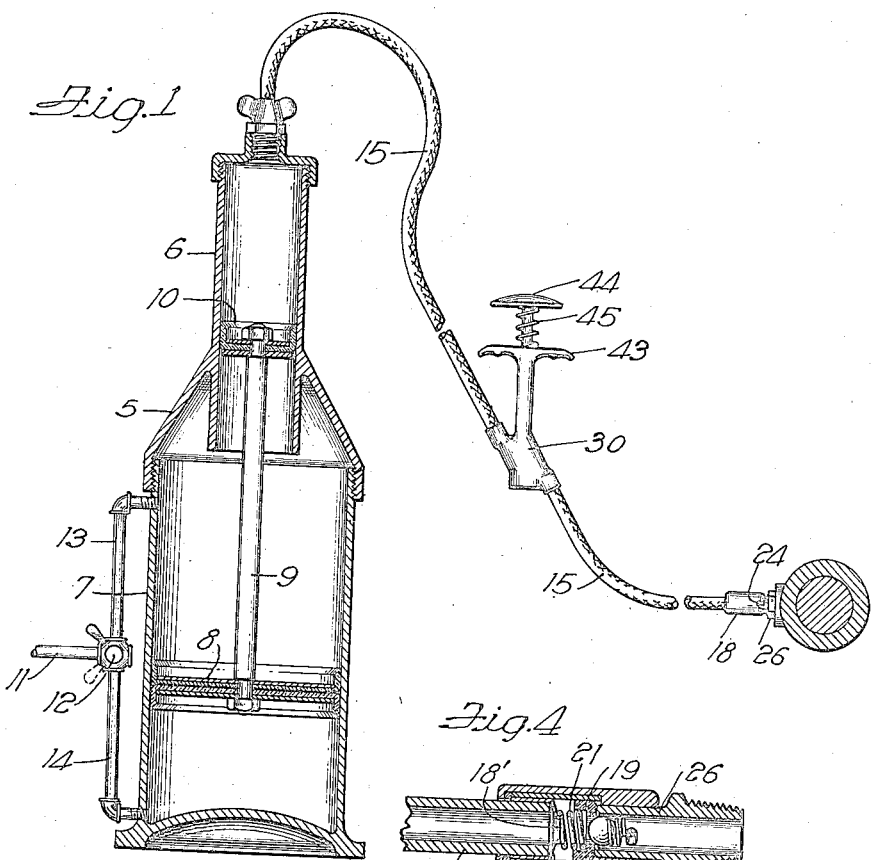
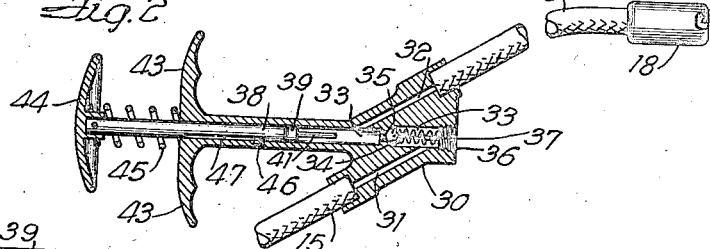
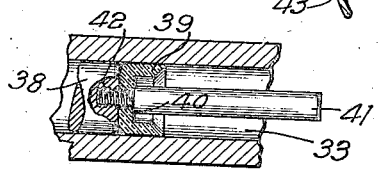
Inventor
Ernest W. Davis
Williams, Bradbury &c.
Attys.

Patented July 24, 1923.

1,462,689

UNITED STATES PATENT OFFICE.

ERNEST W. DAVIS, OF OAK PARK, ILLINOIS, ASSIGNOR, BY MESNE ASSIGNMENTS, TO THE BASSICK MANUFACTURING COMPANY, A CORPORATION OF DELAWARE.

LUBRICATING SYSTEM.

Application filed March 17, 1920. Serial No. 366,625.

*To all whom it may concern:*

Be it known that I, ERNEST W. DAVIS, a citizen of the United States, and resident of Oak Park, in the county of Cook and State of Illinois, have invented a certain new and useful Improvement in Lubricating Systems, of which the following is a full, clear, concise, and exact description, reference being had to the accompanying drawings, forming a part of this specification.

My invention relates to improvements in lubricating systems and is especially concerned with improvements in lubricating systems of the type disclosed in the patent to Arthur V. Gullborg, Patent No. 1,307,734 of June 24, 1919.

The above mentioned patent discloses a lubricating system comprising a plurality of coupling members or nipples adapted to be attached to a plurality of bearings forming portions of a mechanism to be lubricated. A lubricant compressor is provided, having a flexible discharge conduit, one end of which is provided with a coupling member adapted to be successively attached to and detached from the coupling members or nipples and providing a fluid-tight connection between the discharge conduit of the lubricant compressor and the nipples.

The coupling member forming a part of the system disclosed in the Gullborg patent is so constructed that to release it from the nipples, it is first necessary to force it toward the nipples before it can be rotated to detach it therefrom. With this means, it is necessary each time the coupling member is detached from a nipple, to first relieve the pressure on the lubricant because if the pressure is not relieved it is difficult, if not impossible, to move the coupling member toward the nipples to release it therefrom if there is any considerable pressure on the lubricant, and second, because there is nothing to prevent the lubricant from being discharged through the coupling member when it is detached from the nipples if the lubricant is under pressure.

While the above described system is entirely practicable, where the lubricant compressor is portable and is designed to be carried by the mechanism to be lubricated by the person operating it, so that it is easy to relieve the pressure each time the coupling member is to be detached from the nipple, it is one of the objects of my invention to provide a lubricating system adapted to be used in garages and other places where a plurality of vehicles are to be lubricated, comprising means for holding a considerable quantity of lubricant, means for subjecting the lubricant to a continuous pressure, said means having a discharge conduit provided with a coupling member adapted to be connected with the nipples and means whereby the coupling member can be attached to and detached from the nipples without the necessity of each time relieving the pressure on the lubricant in the compressor.

Another object of my invention is to provide means of the character described wherein the means for relieving the pressure on the lubricant confined in the coupling member is located adjacent to the coupling member so that both of these instrumentalities can be conveniently operated at the same time.

A still further object of my invention is to provide a system of the character described, which is simple in construction and economical to manufacture.

Other objects will appear as this description progresses, reference being had to the accompanying drawings wherein—

Figure 1 discloses my complete system, the lubricant compressor and the bearing to which the lubricant is being supplied being shown in section, and the remaining portions being shown in side elevation.

Figure 2 is an enlarged sectional detail of the means which I employ for controlling the supply of lubricant to the nipples and for relieving the pressure upon the coupling member.

Figure 3 is a sectional detail taken upon a still larger scale of a portion of the construction shown in Figure 2, and Figure 4 is a central longitudinal section through a nipple and a coupling member forming a part of my invention.

Throughout the several figures, similar reference characters will be used to refer to similar parts.

Referring, for the present, to Figure 1, reference character 5 indicates, as a whole, a lubricant compressor which is especially adaptable for use in garages, in which it is common to have an air compressor. This lubricant compressor comprises a pump cylinder 7, having a double acting piston 8 therein which is connected by the piston rod 9 with the piston 10, operating in the cylinder 6. Air under pressure is conveyed from a source, not shown, through a pipe 11 to a four-way-valve 12 which, in conjunction with the pipes 13 and 14, controls the supply of air under pressure to the opposite sides of the piston 8. With the valve in one position, air under pressure is supplied through the pipe 14 to the lower side of the piston 8 and the upper end of the cylinder is vented through the pipe 13 and the four-way-valve to atmosphere. In this manner, pressure is placed upon the lubricant through the piston 10. When the cylinder 6 has been emptied of lubricant by reversing the position of the valve 12, air under pressure is admitted to the upper end of the cylinder 7 through the pipe 13 and exhausted from the lower end through the pipe 14 and the four-way-valve. With this construction, I am enabled to place a continuous pressure upon the lubricant in the cylinder 6, the amount of this pressure being determined by the areas of the pistons 8 and 10 and the pressure of the air supplied through the pipe 11.

For ordinary use, I prefer that the pressure upon the lubricant in the cylinder 6 should be about 700 or 800 pounds per square inch, although for certain purposes, it may be found necessary to increase this pressure. Suitably connected with the upper end of the lubricant compressor cylinder 6 is a discharge conduit 15 which may be formed in part or in whole of flexible metallic conduit adapted to withstand the pressure to which the lubricant is subjected. Secured to the free end of this conduit is a coupling member comprising a sleeve 16 which is soldered to a cap 17, which, in turn, is soldered to the outer wall of the flexible conduit 15 and the end of which is provided with an aperture 18 registering with the bore of the conduit. Rotatably mounted upon the sleeve 16 is a second sleeve 18. A centrally perforated leather gasket 19 is slidably mounted in the sleeve 16. The outer sleeve 18 is formed with a shoulder 20 toward which the gasket is urged by a spring 21 confined between the gasket and the end of the cap 17. The outer sleeve 18 is provided with a pair of oppositely disposed bayonet slots 22, one edge of which is provided with a locking recess 23 in which the ends of the pins 24 are adapted to seat when the coupling member is connected with the nipples 26 shown in longitudinal section. These nipples are illustrated and described in the patent to Arthur V. Gullborg above referred to. A further description thereof appears to be unnecessary.

The details of the coupling member just described are illustrated and claimed in the co-pending application of Andrew Fesler, Serial No. 294,848, filed May 5, 1919, and I do not claim the details thereof as any part of my invention. It will be noted that with a coupling construction as shown, when the coupling member is attached to the nipple, the spring 21 is compressed and tends to hold the ends of the pins 24 in the locking recesses 23 of the slots 22.

It will also be apparent that when lubricant is forced through the conduit under pressure, it will exert its pressure upon the side of the gasket 19 toward the compressor and will tend to separate the coupling member from the nipple thereby locking the ends of the pins 24 in the recesses 23.

From the above description, it will be clear that before the coupling member can be detached from the nipple, the pressure on the lubricant therein must be relieved at least whenever this pressure is sufficient to make it difficult to detach the coupling member from the nipple. At the same time, means must be provided for preventing the lubricant from escaping through the coupling member when it is detached from the nipple.

I shall now describe the means whereby I control the supply of lubricant to the nipples and whereby I relieve the pressure upon the lubricant in the coupling member when it is desired to disconnect the coupling member from the nipples. This means comprises a valve body 30 having an intake port 31 connected with that portion of the discharge conduit 15 extending between the valve body and the compressor, and a discharge port 32 communicating with the portion of the discharge conduit intermediate the valve body 30 and the coupling member. The adjacent ends of these ports are connected by a cylindrical passageway 33, the bore of which is contracted intermediate the ports 31 and 32 to provide a valve seat 34 for the ball valve 35. The end of the passageway 33 adjacent the intake port 31 is closed by means of a screw-threaded plug 36 which forms an abutment for the spring 37 that holds the valve 35 on its seat 34.

The opposite end of the passageway 33 forms a cylinder for the plunger 38 which is slidably mounted therein, the inner end being provided with a cup leather 39 to prevent the escape of lubricant between the plunger and the wall of the passageway 33. This cup leather is secured to the inner end of the plunger by means of the shoulder 40 of the rod 41, which is secured to the inner end of the plunger 38 by a screw-threaded connection 42, as shown in Figure 3. The rod 41 forms in effect an extension of reduced cross section of the plunger 38. The outer end of the tube forming the passageway 33 is provided with lateral extensions 43 forming a hand-grip. The outer end of the plunger 38 is provided with a handle or hand-grip 44, and a spring 45 located between the outer end of the tube 33 and the hand-grip 44 tends to withdraw the plunger 38 from the passageway 33. The extent of retraction is limited by a set screw 46 co-acting with the ends of the slot 47 formed in one side of the plunger 38.

In use, the coupling member is first attached to a nipple, the hand-grips 43 and 44 are grasped by one hand of the operator, who by applying pressure to the hand-grip 44, forces the plunger 38 inwardly until the free end of the rod 41 engages the ball valve 35 and displaces it from its seat against the pressure of the lubricant in that part of the conduit 15 extending between the compressor and the valve body. The lubricant thereupon passes through the passageway 33, the discharge port 32, flexible conduit 15 and the coupling member 18, and is forced into the nipple. When a sufficient quantity of lubricant has been forced into the nipple, the pressure on the hand-grip 44 is relieved, whereupon the spring 45 retracts the plunger from its advanced position in the passageway 33, thereby permitting the valve 35 to close upon its seat and prevent any further flow of lubricant through the valve. The valve 35 will close before the plunger 38 is completely retracted. Further retraction of the plunger will, therefore, provide a space in the passageway 33, in which the lubricant in that portion of the discharge conduit between the coupling member and the valve body is free to be displaced when the coupling member is disconnected from the nipple.

The spring 45 can be dispensed with, if desired, whereupon the plunger 38 will be displaced outwardly whenever the pressure is relieved and first by the pressure of the lubricant produced by the compressor 6, and then, after the valve 35 closes, by the pressure impressed upon the lubricant in the portion of the conduit 15 extending between the coupling member and the valve when the coupling member is disconnected from the nipples. If the spring 45 is used, it will tend to retract the plunger 38 after the valve 35 has closed, and will thereby form a vacuum in that portion of the passageway in which it operates, which will tend to pull the lubricant back through that portion of the discharge conduit extending between the coupling member and the valve.

While I have described the details of the preferred embodiment of my invention, it is to be clearly understood that my invention is not limited to these details but is capable of other adaptations and modifications within the scope of the appended claims.

Having thus described my invention, what I claim is:

1. The combination with a nipple adapted to receive lubricant, of a source of lubricant under pressure for supplying lubricant to said nipple, a discharge conduit for said source of lubricant, the free end of which is provided with a coupling member adapted to be detachably connected to said nipple, means intermediate said source of pressure and said coupling member for controlling the flow of lubricant through said discharge conduit, comprising a valve body having an intake port connected with a portion of said conduit leading to said source of pressure, and a discharge port connected with the portion of said conduit connected with said coupling member, the said valve body being provided with a passageway connecting said ports and comprising a valve seat, a spring-pressed valve co-acting with said seat and opening towards said intake port, a plunger reciprocably mounted in said passageway and provided with an end portion of reduced cross section for unseating said valve, and forming a space between said reduced portion and the walls of said passageway, providing communication between said ports, co-acting hand grips on said valve body and said plunger, and a spring for retracting said plunger.

2. The combination with a nipple adapted to receive lubricant, of a source of lubricant under pressure for supplying lubricant to said nipple, a discharge conduit for said source of lubricant, the free end of which is provided with a coupling member adapted to be detachably connected to said nipple, means intermediate said source of pressure and said coupling member for controlling the flow of lubricant through said discharge conduit, comprising a valve body having an intake port connected with a portion of said conduit leading to said source of pressure, and a discharge port connected with the portion of said conduit connected with said coupling member, the said valve body being provided with a passageway connecting said ports and comprising a valve seat, a valve co-acting with said seat and opening towards said intake port, a plunger reciprocably mounted in said passageway and provided with an end portion of reduced cross section for unseating said valve, and forming a space between said reduced portion and the walls of said passageway, providing communication between said ports.

3. The combination with a nipple adapted to receive lubricant, of a source of lubricant under pressure for supplying lubricant to said nipple, a discharge conduit for said source of lubricant, the free end of which is provided with a coupling member adapted to be detachably connected to said nipple, means intermediate said source of pressure and said coupling member for controlling the flow of lubricant through said discharge conduit, comprising a valve body having an intake port connected with a portion of said conduit leading to said source of pressure, and a discharge port connected with the portion of said conduit connected with said coupling member, the said valve body being provided with a passageway connecting said ports and comprising a valve seat, a valve co-acting with said seat and opening towards said intake port, means for opening said valve against the pressure of said lubricant, and means for decreasing the capacity of the portion of said passageway on the side of said valve adjacent said discharge port when said valve is open, and for increasing the capacity of said portion of the passageway when said valve is closed, whereby the lubricant in the portion of said discharge conduit extending between said coupling member and said valve body can expand into said passageway to permit said coupling member to be disconnected from said nipple.

4. The combination with a member adapted to receive lubricant, of a source of lubricant under pressure, a discharge conduit for said source of lubricant, the free end of which is provided with a coupling member adapted to be detachably connected with said lubricant receiving member, a valve intermediate the ends of said discharge conduit for controlling the flow of lubricant therethrough, means for opening and closing said valve, and means for limiting the capacity of said conduit when said valve is open, and for increasing its capacity on the side of said valve adjacent said coupling member when said valve is closed.

5. The combination with a member adapted to receive lubricant, of a source of lubricant under pressure, a discharge conduit for said source of lubricant, the free end of which is provided with a coupling member adapted to be detachably connected with said lubricant receiving member, means for controlling the flow of lubricant through said conduit, comprising means for stopping the flow of lubricant through all but a portion of said conduit connected with said coupling member, and means for enlarging the capacity of said last mentioned portion to relieve the pressure on said lubricant in said portion.

6. The combination with a member adapted to receive lubricant, of a source of lubricant under pressure, a discharge conduit for said source of lubricant, the free end of which is provided with a coupling member adapted to be detachably connected with said lubricant receiving member, and means for temporarily increasing the capacity of said conduit while said coupling member is secured to said lubricant receiving member.

7. The combination with a member adapted to receive lubricant, of a source of lubricant under pressure, a discharge conduit for said source of supply, comprising a coupling member adapted to be connected with said lubricant receiving member, and means connected with said conduit for temporarily receiving lubricant from said conduit and then returning said lubricant to said conduit.

In witness whereof, I hereunto subscribe my name this 9th day of March, 1920.

ERNEST W. DAVIS.

Witnesses:
MARY A. COOK,
ANDREW WINTERCORN.